United States Patent
Ivanov et al.

(10) Patent No.: US 6,513,737 B2
(45) Date of Patent: Feb. 4, 2003

(54) APPARATUS AND PROCESS FOR PULVERIZATION OF A POLYMERIC MATERIAL

(75) Inventors: George K. Ivanov, Downers Grove, IL (US); Hamid Arastoopour, Downers Grove, IL (US); Ecevit Bilgili, Chicago, IL (US); Nima Shahidi, Chicago, IL (US); Barry Bernstein, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 09/802,430

(22) Filed: Mar. 9, 2001

(65) Prior Publication Data

US 2002/0125352 A1 Sep. 12, 2002

(51) Int. Cl.$^7$ .............................. B02C 19/22
(52) U.S. Cl. .................. 241/23; 241/67; 241/260.1
(58) Field of Search .................. 341/DIG. 31, 65, 341/23, 66, 67, 260.1

(56) References Cited

U.S. PATENT DOCUMENTS

| | | |
|---|---|---|
| 3,525,124 A | 8/1970 | Ocker |
| 4,090,670 A | 5/1978 | Bennett |
| 4,098,463 A | 7/1978 | Lowry |
| 4,142,689 A | 3/1979 | Kemp, Jr. et al. |
| 4,511,091 A | 4/1985 | Vasco |
| 4,607,797 A | 8/1986 | Enikolopow et al. |
| 4,650,126 A | 3/1987 | Feder et al. |
| 4,875,847 A | 10/1989 | Wenger et al. |
| 4,890,996 A | 1/1990 | Shimizu |
| 4,951,887 A | 8/1990 | Gutnecht |
| 4,968,463 A | 11/1990 | Levasseur |
| 5,026,512 A | 6/1991 | Chang |
| 5,356,054 A | 10/1994 | Loppoli et al. |
| 5,397,065 A | 3/1995 | Shutov et al. |
| 5,704,555 A | 1/1998 | Arastoopour |
| 5,743,471 A | 4/1998 | Ivanov |
| 5,769,335 A | 6/1998 | Shutov |
| 5,799,880 A | 9/1998 | Roberson et al. |
| 5,814,673 A | 9/1998 | Khait |
| 6,325,307 B1 * | 12/2001 | Nikolskii et al. ............ 241/23 |

OTHER PUBLICATIONS

Nikolai S. Enikolopian, *Some aspects of chemistry and physics of plastic flow*, Pure & Appl. Chemistry, vol. 54, No. 11, 1701–1711, 1985.

* cited by examiner

*Primary Examiner*—Mark Rosenbaum
(74) *Attorney, Agent, or Firm*—Pauley Petersen Kinne & Erickson

(57) ABSTRACT

An apparatus and process for pulverization of polymeric material having a multi-component screw disposed within an elongated cylindrical housing. The multi-component screw has an independently rotatable extrusion portion and an independently rotatable pulverization portion. A cooling means is provided to maintain the fine powder material produced during the pulverization process at a desired temperature. In one embodiment of this invention, a second multi-component screw having an independently rotatable extrusion portion and an independently rotatable pulverization portion is disposed within the elongated cylindrical housing.

34 Claims, 6 Drawing Sheets

APPARATUS AND PROCESS FOR PULVERIZATION OF A POLYMERIC MATERIAL

BACKGROUND OF THE INVENTION

1. Field of the Invention

This invention relates to an apparatus and process for pulverization to fine powder material of solids and mixtures of solids, such as polymers, copolymers, homopolymers, rubbers, wood, agricultural products, and mixtures of synthetic and natural polymers which, until now, have been resistant to such fine pulverization at high output.

2. Description of Related Art

Currently, there are three basic reclaiming processes of virgin and used plastics in wide use: chemical reclaiming processes, which include pyrolysis, hydrolysis, and incineration; thermal reclaiming processes, which, for example, include extrusion, injection molding, and pressure molding; and mechanical reclaiming processes, which include granulation, densification, agglomeration, and pulverization. However, these known processes generally have disadvantages ranging from high energy consumption, a reduction in original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize the rubber tires followed by removal of the devulcanized material, such as by rasping. However, this method is limited to rubber and does not produce fine powders as desired for many reuse applications.

Reclamation of thermoplastic materials including shredding, grinding and comminuting is exemplified by U.S. Pat. No. 4,968,463 which teaches shredding waste plastic to about one hundred millimeters and grinding to under about 40 millimeters, followed by drying, pre-heating to 80° C. to 160° C., kneading at 120° C. to 250° C., and injection molding or extruding; U.S. Pat. No. 4,650,126 which teaches heating plastic particles to melt the surface to retain a grinding aid thereon and maintaining a counter-rotating attrition mill at a temperature to retain nearly all of the grinding aid in the softened polymer particles during grinding, followed by an air stream which serves to separate the grinding aid and as a material carrier medium; U.S. Pat. No. 4,511,091 which teaches thermoplastic scrap recovery combined with phonographic record pressing in which the hot trimmed waste is cooled, ground, and mixed with virgin material for formation of phonograph records; and U.S. Pat. No. 4,098,463 which teaches a liquid cooling spray to maintain the temperature in a cutting chamber such that the plastic is hard, which reduces the fibers embedded in the comminuted particles from plastic electrical or telephone cord insulation.

Various screw devices are known for conveyance and processing in the synthetic polymer industry. Molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point, with the maximum temperature at the outlet, is taught by U.S. Pat. No. 5,026,512. U.S. Pat. No. 4,890,996 teaches continuous granulating by melting, kneading and granulating macromolecules wherein a double screw kneader without lateral communication is capable of adjusting the degree to which material is kneaded by axial adjustment of the cylinders and screws with respect to each other.

Conical screw sections are known to be used for specific purposes. A twin screw extruder, especially suited for viscous material, having frusto-conical screw sections and separate barrel sections at the outlet end providing bearing-type support for the separate screws is taught by U.S. Pat. No. 4,875,847. U.S. Pat. No. 3,525,124 teaches an extracting apparatus having screw-threaded shafts rotatable within a housing and having conveying and milling sections within an obstruction section between for pressure sealing. The screw in the housing may be tapered to form the obstruction section, thereby providing independent heat and pressure control in the conveying and milling sections.

Chemical and physical aspects of transformation of polymeric materials, such as pulverization, under simultaneous high pressure and shear is described in Nikolai S. Enikolopian, "Some Aspects of Chemistry and Physics of Plastic Flow", *Pure and Applied Chemistry*, Vol. 57, No. 11, pp. 1707–1711, (1985).

U.S. Pat. No. 4,607,797 teaches pulverization of used polymers in an extrusion apparatus having a barrel with at least one cylindrical rotatable screw. When two screws are used, they are co-rotational. In accordance with the teachings of this patent, material is fed to one end of the barrel, heated to above its fusing (melting) temperature in a first zone, and cooled to below its solidification temperature with simultaneous pre-crushing and pulverizing of the solidified material in a second zone to form a powdered material which is discharged from the opposite end of the barrel. Screw action is used to convey the material through the barrel and substantially elliptical or triangular kneading or pulverizing disks non-rotatably mounted on the screw in the cooling zone perform the pre-crushing and pulverizing. The process is carried out at 0.25 to 0.30 MPa. This process is said to continuously produce particles having a very uniform grain size, for example, in the case of polyethylene, only 2% larger than 160 microns.

U.S. Pat. No. 4,607,797 teaches pulverization of rubber and vulcanization products in a standard single-or-multiple screw extruder by compressing the material to be pulverized at a pressure of 0.2 to 0.7 MPa and then subjecting the compressed material to a shear force of 0.03 to 5 $N/mm^2$ at a pressure of 0.2 to 50 MPa and a temperature of 80° to 250° C., forming hot sheared material which is subjected to a shearing force of 0.03 to 5 $N/mm^2$ at a pressure of 0.2 to 50 MPa and a temperature of 15° to 60° C., forming cooled powdered material. Addition of granulated polyethylene to butyl rubbers is necessary to obtain finely dispersed powders. This process is said to result in particles not exceeding 500 micrometers in the case of natural rubber and 300 micrometers with other rubbers.

Natural and synthetic polymer wastes are increasing and environmental concerns about their disposition render recycling necessary. However, many of the aforementioned reclamation processes are limited to certain types of wastes and particularly limited with respect to mixed wastes, are uneconomical, particularly with respect to energy consumption, and do not provide reclaimed material in a form conducive to reuse manufacturing.

These issues are addressed by the extrusion pulverization apparatus and method taught by U.S. Pat. No. 5,397,065 and U.S. Pat. No. 5,704,555, in which the polymeric material is heated to a softening temperature below its melting temperature to produce a continuous film of polymeric material which is then cooled and subjected to shear and normal forces sufficient to form the film of polymeric material into a fine powder material. A gas stream then fluidizes the fine powder material to prevent agglomeration and/or melting of the fine powder material.

See also U.S. Pat. No. 5,743,471, which teaches an apparatus having at least one screw, housed within an elongated barrel, having a high shear screw section for applying shear and normal forces to polymeric material to form a powder of polymeric material.

U.S. Pat. No. 5,769,355 teaches an apparatus and method for pulverizing solid polymer materials into smaller particles wherein the apparatus has a pulverizer head with a rotor having a conical contact surface and a stationary dish with a corresponding inverted conical contact surface. The dish and the rotor are axially aligned and spaced apart to form a gap. Rotation of the rotor generates shear forces within the gap that pulverizes the material, with the pulverized particles leaving the pulverizer head at the outer margin of the gap. Thus, no pulverization occurs within a housing.

Although the known extrusion pulverization methods and apparatuses address many of the issues associated with prior pulverization methods and apparatuses, there remains significant room for improvement.

SUMMARY OF THE INVENTION

It is one object of this invention to provide an apparatus and process for pulverization of polymeric material having increased powder throughput compared to known apparatuses and processes utilizing an extruder.

It is another object of this invention to provide a process and apparatus for pulverization of polymeric materials which produce finer powder material particles than known processes and apparatuses utilizing an extruder.

It is yet another object of this invention to provide an apparatus and process for pulverization of polymeric material which substantially prevent agglomeration of the fine powder material produced by the pulverization of the polymeric material.

It is yet another object of this invention to provide an extrusion pulverization process and apparatus which provide high shear force on the material, independent of the extruder driver.

These and other objects of this invention are addressed by an apparatus for extrusion pulverization of a polymeric material comprising a multi-component screw having an extrusion portion and a pulverization portion with a controllable shear force, said extrusion portion and said pulverization portion connected to each other and being independently rotatable with respect to each other. In accordance with one preferred embodiment, a plurality of multi-component screws, each having an extrusion portion and a pulverization portion, are disposed within the elongated cylindrical housing.

In the process for extrusion pulverization of polymeric materials according to this invention, polymeric material is fed into the extruder feeding section of an elongated cylindrical housing in which is disposed the extrusion portion of a multi-component screw which rotates to move the polymeric material through the extrusion section of the elongated cylindrical housing. Depending on the physical nature and properties of the polymeric material, the polymeric material can be heated in the extrusion section. The material moves through the extrusion section to the pulverization section of the elongated cylindrical housing which is disposed downstream of the extrusion section. Although, in general, no pulverization is expected to occur within the extrusion section, depending on the physical nature of the polymeric material and temperature profile of the elongated cylindrical housing, partial pulverization may occur. Within the pulverization section, the polymeric material passes between the inner surface of the elongated cylindrical housing and the outer surface of the pulverization portion wherein controllable forces are applied to the polymeric material sufficient to form a fine powder. Cooling is employed to maintain the temperature of the pulverized material low enough to prevent agglomeration or melting of produced particles. Additionally, or in the alternative, an inner pulverization screw portion cooling and/or a cooling jacket surrounding the pulverization section of the elongated cylindrical housing may be utilized for this purpose.

The apparatus of this invention is applicable to a variety of polymers, such as, high and low density polyethylene, rubber, mixtures of high and low density polyethylene and rubber, and high and low density polyethylene and wood, copolymers, phenolic resins and thermoset polyurethane. The fine particle polymeric material produced by the apparatus of this invention enables much broader end uses as fillers and reinforcement agents in matrices, such as polymer, ceramic, gypsum, concrete, and asphalt. This is important to practical utilization of products of recycling polymer wastes, both pre- and/or post-consumer, to reduce the environmental problems caused by such solid wastes.

BRIEF DESCRIPTION OF THE DRAWINGS

These and other objects and features of this invention will be better understood from the following description taken in conjunction with the drawings wherein.

DETAILED DESCRIPTION OF PREFERRED EMBODIMENTS

Figure 1:
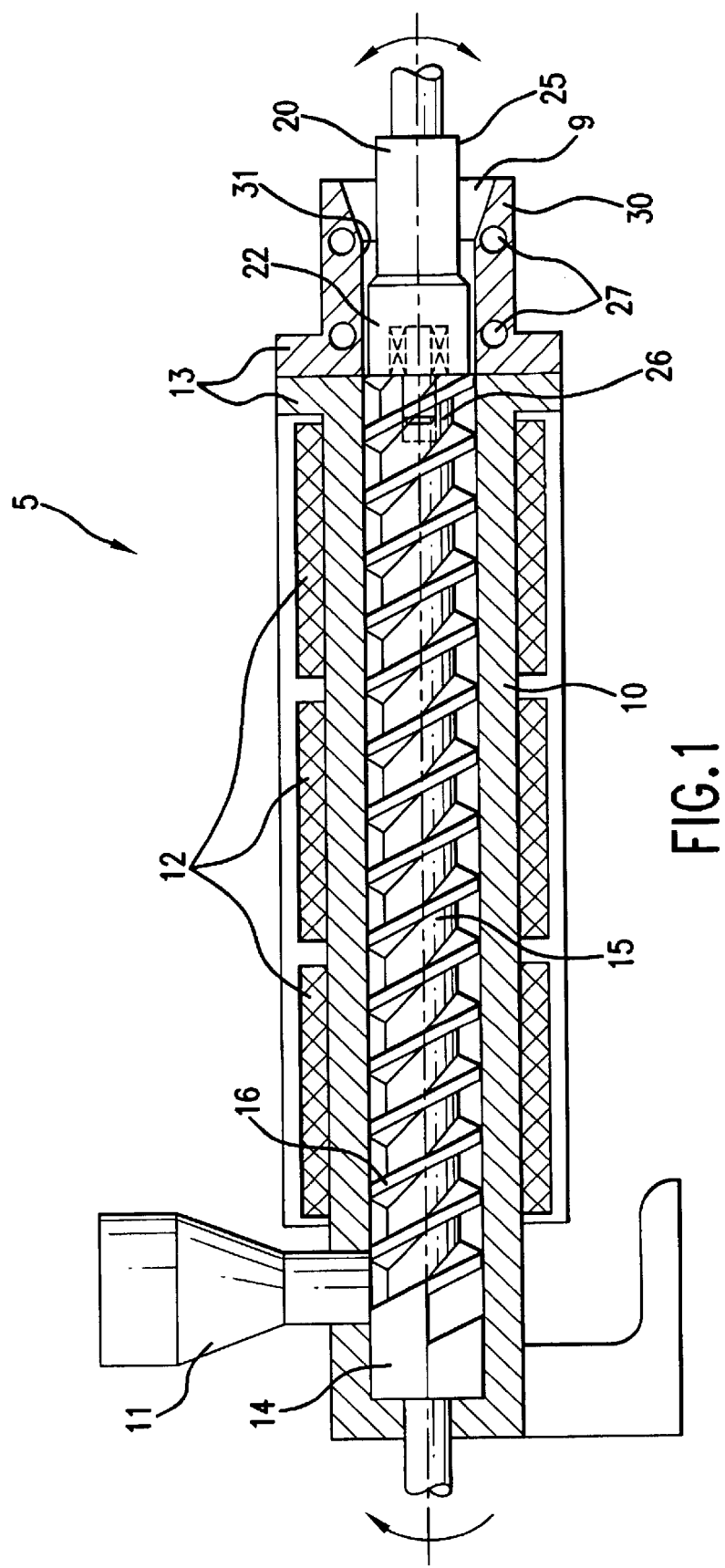
FIG. 1 is a longitudinal sectional view of an apparatus for extrusion pulverization of a polymeric material having a multi-component screw, in accordance with one embodiment of this invention.
Figure 2:
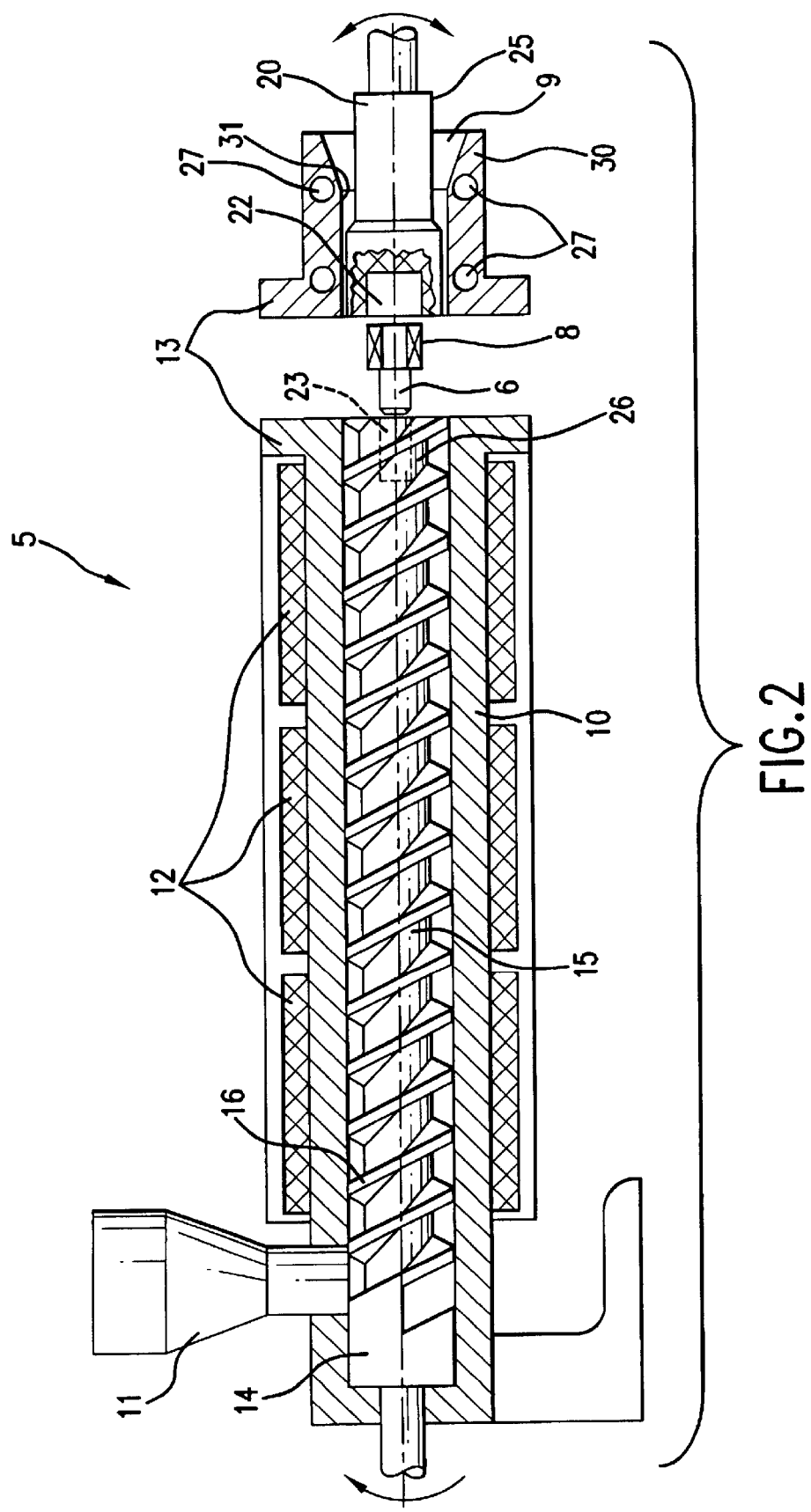
FIG. 2 is an exploded sectional view of an apparatus for extrusion pulverization of a polymeric material, in accordance with one embodiment of this invention.

As shown in FIGS. 1 and 2, an apparatus 5 for extrusion pulverization has a feed hopper 11 for feeding polymeric materials to a feeding zone within an elongated cylindrical housing 13. Combined heaters/coolers 12 are provided surrounding an exterior of elongated cylindrical housing 13 in the region of a heating/extrusion section and/or a cooling/pulverization section.

As shown in FIGS. 1 and 2, elongated cylindrical housing 13 comprises an extrusion section 10 and a pulverization section 30. A multi-component screw 14 is disposed within elongated cylindrical housing 13 and comprises at least one extrusion portion 15 and at least one pulverization portion 20 joined together end-to-end. Extrusion portion 15 and pulverization portion 20 are independently rotatable with respect to each other. Extrusion portion 15 of multi-component screw 14 is driven by a first driver (not shown) and pulverization portion 20 of multi-component screw 14 is driven by a second driver (not shown). Preferably, the first driver and the second driver are motors. Other conventional driver means known to those skilled in the art may be used to independently rotate extrusion portion 15 and pulverization portion 20.

As shown in FIG. 2, extrusion portion 15 of multi-component screw 14 is connected to pulverization portion 20 within elongated cylindrical housing 13 by a pin 6 and a bearing 8 disposed within an upstream end 22 of pulverization portion 20. Pin 6 is fixedly inserted, such as by press-fitting, into an opening 23 formed at a downstream end 26 of extrusion portion 15 of multi-component screw 14. In this manner, bearing 8 enables independent rotation of extrusion portion 15 and pulverization portion 20. It will be apparent to those skilled in the art that other means for connecting extrusion portion 15 and pulverization portion 20 in a manner which enables independent rotation of extrusion portion 15 and pulverization portion 20 are possible, and there is no intention by this disclosure to exclude such additional means.

In accordance with one preferred embodiment of this invention, extrusion portion 15 comprises a plurality of flights 16 preferably, but not necessarily, evenly spaced along a length of extrusion portion 15. The distance between flights 16 in the feeding zone preferably corresponds to the size of polymeric particles introduced into extrusion section 10 of elongated cylindrical housing 13 so that the polymeric particles will fit between flights 16. As extrusion portion 15 rotates, the flights move the polymeric material through extrusion section 10 of elongated cylindrical housing 13. The rotational speed of extrusion portion 15 is adjustable to correspond to the rate at which the polymeric material is fed into extrusion section 10. Preferably, extrusion portion 15 rotates at about 10 revolutions per minute ("RPM") to about 1500 RPM, more preferably at about 50 RPM to about 1000 RPM.

Figure 3B:
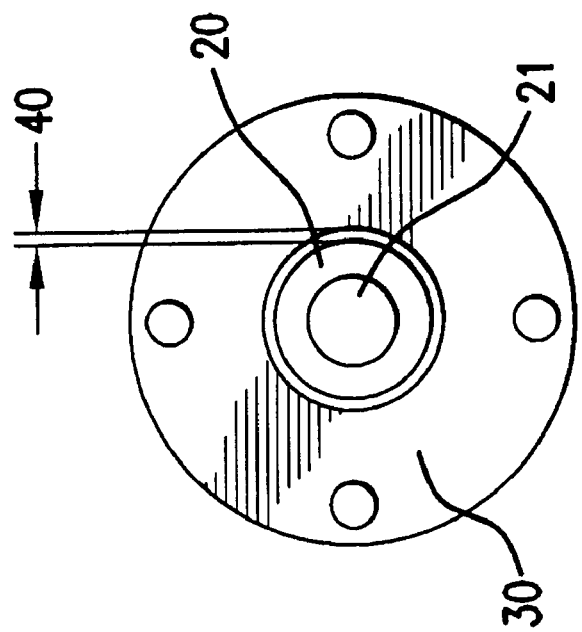
FIG. 3b is a front view of a pulverization section of an apparatus for extrusion pulverization of polymeric material, in accordance with one embodiment of this invention.
Figure 3A:
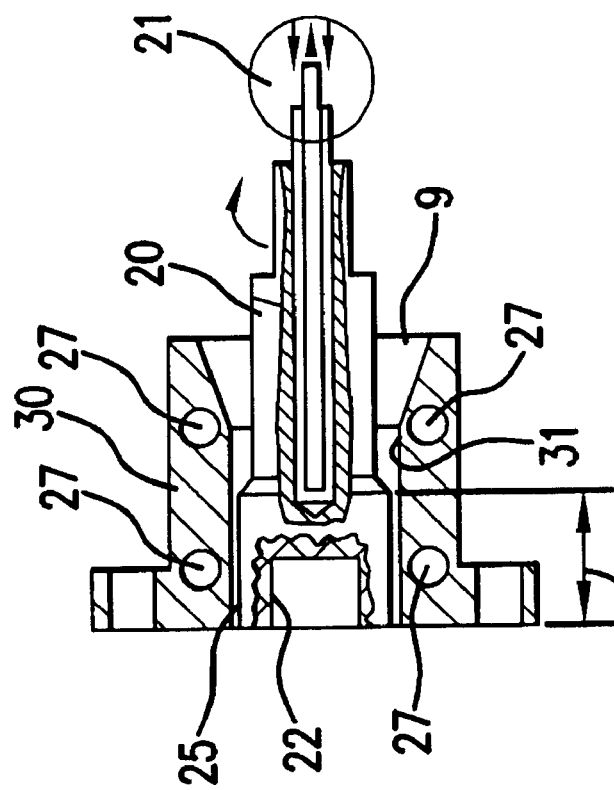
FIG. 3a a sectional view of a pulverization section of an apparatus for extrusion pulverization of a polymeric material, in accordance with one embodiment of this invention.

In accordance with one preferred embodiment of this invention as shown in FIGS. 3a and 3b, pulverization portion 20 of multi-component screw 14 forms at least one space or channel 21 for receiving a cooling fluid, in addition to the cooling provided to elongated cylindrical housing 13.

It is to be understood that pulverization portion 20 may have any of a number of different configurations, such as a solid or hollow body having a cylindrical or conical shape. In accordance with one preferred embodiment of this invention, pulverization portion 20 is a cylindrical shaped body having a smaller outer diameter than the outer diameter of extrusion portion 15. However, it will be apparent to those skilled in the art that the outer diameter of pulverization portion 20 can be equal to or larger than the outer diameter of extrusion portion 15 if desired, depending upon the material being processed and the requisite conditions for pulverization of the material.

As previously indicated, pulverization portion 20 and extrusion portion 15 are rotatable independently of each other. As a result, pulverization portion 20 may rotate at a different speed than a speed at which extrusion portion 15 rotates and pulverization portion 20 may rotate in a different direction than a direction in which extrusion portion 15 rotates. This allows for a high-torque shearing force to be applied to the polymeric material in pulverization section 30 as pulverization portion 20 rotates independently of the speed at which extrusion portion 15 rotates. Preferably, pulverization portion 20 rotates at a speed in the range of about 10 RPM to about 1500 RPM, more preferably at about 50 RPM to about 1000 RPM. The rotational speed of extrusion portion 15 and pulverization portion 20 can be easily monitored and adjusted to optimize throughput and pulverization of the polymeric material.

Preferably, an outer surface 25 of pulverization portion 20 is generally smooth, as shown in FIGS. 1–3a. During the pulverization process in which pulverization portion 20 rotates to move the polymeric material through pulverization section 30, forces, including shear forces, normal forces and compression forces, are exerted on the polymeric material. Smooth, mirror-like outer surface 25 and a smooth inner surface 31 allow for maximum exposure of the polymeric material to the forces applied to the polymeric material as the polymeric material moves through pulverization section 30. However, it will be apparent to those having ordinary skill in the art that outer surface 25 and/or inner surface 31 may be notched and/or treated by means known in the art to produce a surface having an appropriate geometry or roughened finish.

In accordance with preferred embodiments of this invention, the magnitude of the torque applied to the polymeric material as the polymeric material moves between inner surface 31 of elongated cylindrical housing 13 and outer surface 25 of pulverization portion 20 is preferably in the range of less than about 1 Nm to about 2000 Nm, more preferably about 50 Nm to about 500 Nm.

A distance 40 between inner surface 31 of elongated cylindrical housing 13 and outer surface 25 of pulverization portion 20 may be varied to provide for the necessary forces needed to pulverize the polymeric material to optimize pulverization. Preferably, distance 40, as shown in FIG. 3b, between inner surface 31 of elongated cylindrical portion 13 and outer surface 25 of pulverization portion 20 is in the range of about 0.05 mm to about 10.0 mm. This distance is a function of the material being pulverized and the operating conditions of apparatus 5. Further, a length 45 of outer surface 25 of pulverization portion 20 may be varied to provide optimum pulverization. Preferably, length 45 is about 1 mm to about 15.0 cm, more preferably about 1 mm to about 50.0 mm.

In accordance with one embodiment as shown in FIGS. 3a and 3b, pulverization portion 20 comprises a hollow cylinder having means for cooling pulverization portion 20 and in turn the fine powder material produced from the polymeric material during the pulverization process. Cooling of pulverization portion 20 is desirable for the purpose of preventing agglomeration and/or melting of the fine powder material. In accordance with one preferred embodiment of this invention, cooling is accomplished by introducing a cooling fluid into the interior of pulverization portion 20. Said cooling fluid may be gaseous or liquid. In accordance with one preferred embodiment, the cooling fluid is water. To enable the cooling fluid to flow through pulverization portion 20, pulverization portion 20 forms at least one fluid conduit within its interior. In accordance with another embodiment of this invention, a cooling jacket, represented by cooling coils 27 as shown for example in FIGS. 1, 2 and 3a, surrounding elongated cylindrical housing 13 is utilized to maintain the fine powder material within pulverization section 30 at a desired temperature (see Example 1). In accordance with another preferred embodiment of this invention, a cooling coil is utilized to cool pulverization portion 20 and a cooling jacket, represented by cooling coils 27 surrounding elongated cylindrical housing 13, is also utilized to maintain the fine powder materials within pulverization section 30 at a desired temperature (see Example 2). In accordance with one embodiment of this invention, extrusion section 10 is cooled by cooling means such as a fluid cooling jacket disposed around the exterior of extrusion section 10.

Suitable polymeric materials for pulverization in the pulverization apparatus of this invention include polyethylene terephthalate, high-density polyethylene, low-density polyethylene, polypropylene, polyvinyl chloride, styrenes, acrylics, polycarbonates, polyamides, polyurethanes, rubber, and natural polymers, such as wood, agricultural products and corn and cross-linked polymers. Mixtures of composites of these materials may be used. When materials recalcitrant to fine pulverization are present alone, it is desirable to form a mixture of such materials with at least one material which is readily pulverized to the desired fine particles by the process of this invention. Minor amounts of readily pulverized materials, about 5 to about 50 volume percent, depending greatly upon the materials, may be mixed with such recalcitrant materials to produce fine powder material according to this invention. To accommodate recycling of waste polymeric materials, it may be desirable to have present minor amounts, up to about 30 volume percent, of pulverizable materials.

In accordance with the method of this invention, polymeric material to be pulverized is introduced into an upstream end of extrusion section 10 of elongated cylindrical housing 13 through material feeder 11. The polymeric material may be fed to extrusion section 10 in a size range depending on its hardness. For hard polymeric materials, the polymeric material should be about equal to or less than the distance between adjacent flights 16 and a flight depth, preferably up to about 6 mm, more preferably about 1 mm to about 6 mm. Soft polymeric materials having a greater size range may be fed to extrusion section 10. Size reduction to these dimensions may be achieved by many methods known to the art. Extrusion portion 15 of first multi-component screw 14 rotates to move the polymeric material through extrusion section 10 of elongated cylindrical housing 13.

As the polymeric material moves through extrusion section 10, heat is applied to the polymeric material. Heating means capable of heating the polymeric material in extrusion section 10 to a melting temperature or a softening, pre-melt temperature which is below its melting point are disposed in a suitable manner to achieve the desired temperature, at which a small shear stress may result in high deformation. Preferred temperatures are about 3° C. to about 50° C. below the melting or softening point of the polymeric material. Any suitable heating means known in the art may be used; for example, the elongated cylindrical housing may be electrically heated or combined heaters/coolers 12, as shown in FIGS. 1 and 2, surrounding elongated cylindrical housing 13 may be used. The rate at which the polymeric material moves through extrusion section 10 is easily controlled by adjusting the rotational speed of extrusion portion 15 of multi-component screw 14. Extrusion portion 15 moves the heated polymeric material through extrusion section 10 and supplies pulverization section 30 with a continuous solid film of melted or soften polymeric or elastomeric material.

The heated polymeric material moves into cooled pulverization section 30 between inner surface 31 of elongated cylindrical housing 13 and outer surface 25 of pulverization portion 20. As the polymeric material passes between inner surface 31 of elongated cylindrical housing 13 and outer surface 25 of pulverization portion 20, forces, including shear forces, normal forces and compression forces, are applied to the polymeric material sufficient to form a fine powder material from the polymeric material. The magnitude of the forces applied may be varied in part by varying the speed of rotation of pulverization portion 20 of multi-component screw 14.

As the fine powder material passes through pulverization section 30 of elongated cylindrical housing 13, a cooling fluid flowing within pulverization portion 20 cools the fine powder material as it exits, thereby substantially eliminating powder agglomeration and/or melting. The fine powder material particles exiting at material outlet end 9 typically have a particle size of less then about 500 microns, more preferably less than about 100 microns.

EXAMPLE 1

Figure 4:
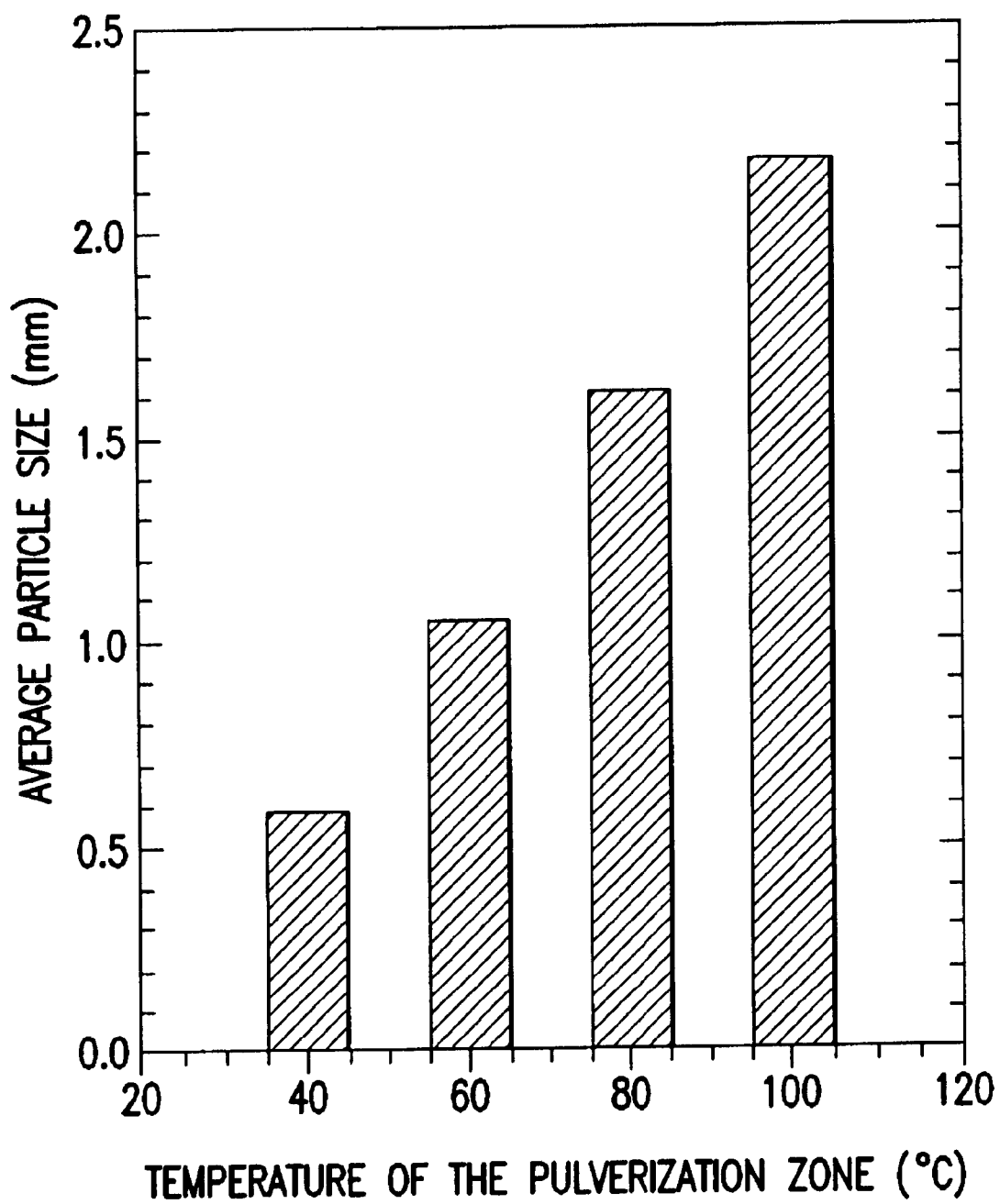
FIG. 4 shows the effect of temperature of the pulverization section on the average particle size of the rubber particles produced using a single screw process, in accordance with one embodiment of this invention.

Waste natural rubber granules of about 1 cm in size were fed at a rate of 4.6 g/min to the extrusion section of the elongated cylindrical housing of a single screw with a compression ratio of about 5:1 and rotating at about 80 rpm, with a length of 35 cm and a clearance of 0.05 mm between the external thread and inner surface of the elongated cylindrical housing and a 0.81 mm clearance between the internal thread and the inner surface of the elongated cylindrical housing in the pulverization section. The extrusion section was heated to 135° C., and the pulverization section was cooled externally by a cooling jacket through which a coolant of 0° C. was passed through. The temperature of the pulverization section varied between 40° C. and 100° C. FIG. 4 shows the effect of the temperature of the pulverization section on the average particle size of the rubber particles produced using a single solid screw process. FIG. 4 is an example of the average particle size versus pulverization zone temperature for a waste rubber material. As it can be seen, the lower housing temperature resulted in smaller produced particles. Thus, the temperature of the pulverization section can be used to control particle size.

Figure 5:
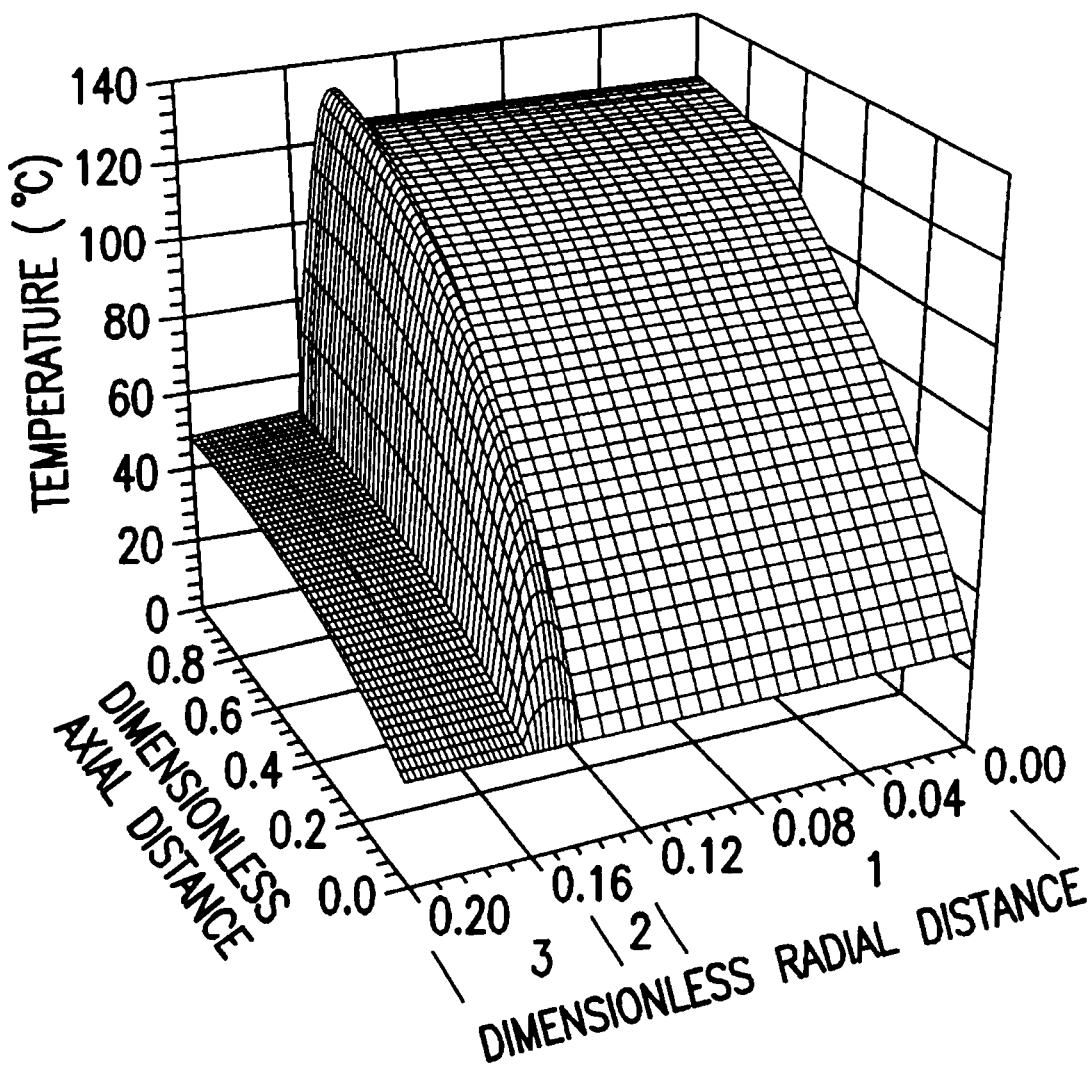
FIG. 5 shows the temperature variation for a screw process after steady-state is reached, in accordance with one embodiment of this invention.

FIG. 5 shows the calculated temperature distribution in the pulverization section at a housing temperature of 40° C. FIG. 5 shows the results of a heat transfer simulation for the solid screw process after a steady-state is reached for chilled water cooling (0° C.) and a convective heat transfer coefficient inside the cooling jacket of about 600 W/m$^{2}$°C. As FIG. 5 clearly indicates, although the housing temperature is low, there is a very high temperature gradient and high temperature at the screw. By lowering the screw temperature, the pulverization average temperature will decrease and finer particles will result.

EXAMPLE 2

Figure 6:
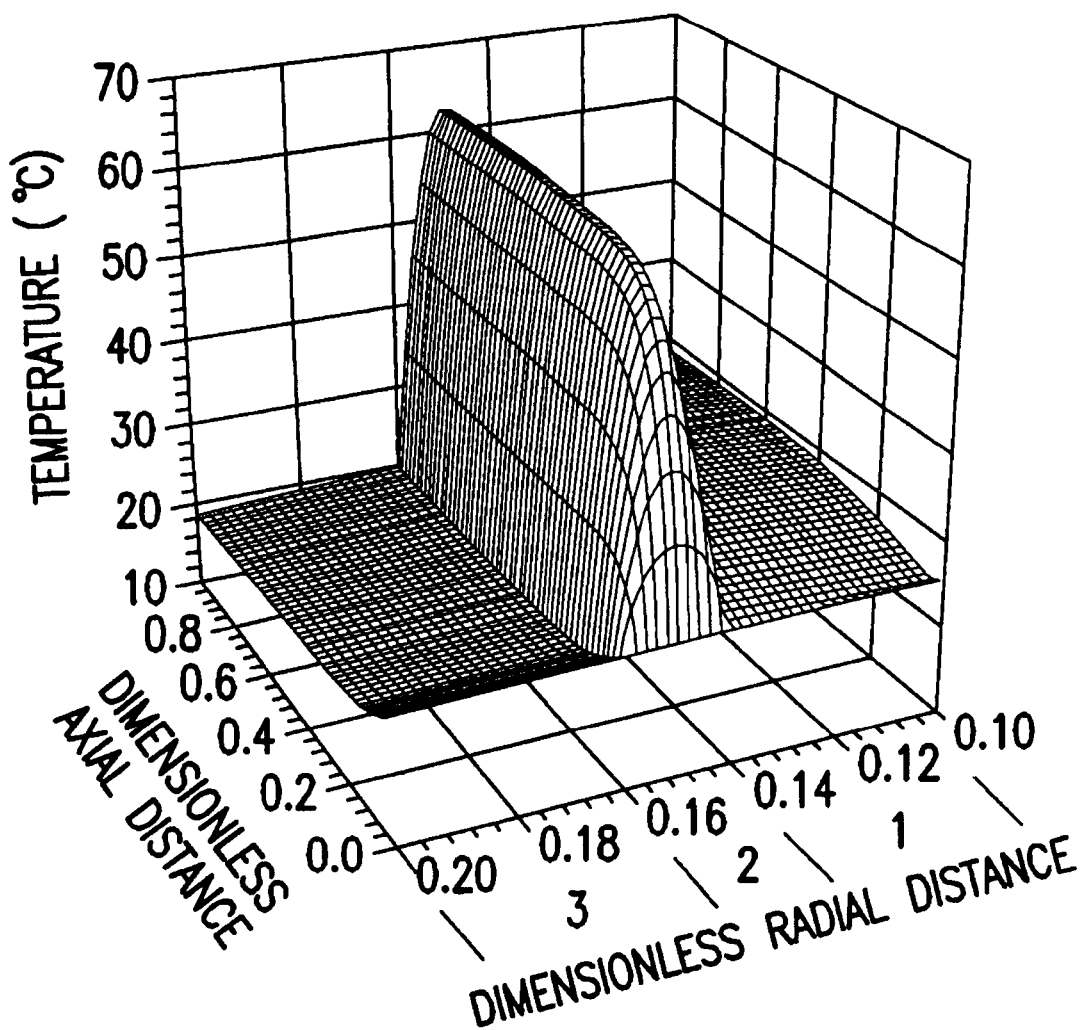
FIG. 6 shows the temperature variation for a hollow screw process after steady-state is reached, in accordance with one embodiment of this invention.

Waste natural rubber granules similar to those in Example 1 were considered in this case. The screw was assumed to be hollow and was cooled by a stream of coolant similar to the external jacket cooling system. FIG. 6 shows our calculated temperature profile in the pulverization section. As it can be seen, not only does the temperature gradient at the material/screw interface decrease, but the maximum material temperature also decreases by 45% with respect to Example 1, which did not use any cooling system for the screw. This is expected to result in significant reduction of produced particle size. Further, we can conclude that a hollow screw with external cooling provides a very efficient way to remove the heat generated during the pulverization process and, in turn control the particle size distribution of the produced particles. FIG. 6 shows the result of a heat transfer simulation for the hollow screw process after a steady-state is reached for chilled water cooling (0° C.) and a convective heat transfer coefficient inside the hollow screw and the cooling jacket of about 600 W/m$^2$°C.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

We claim:

1. An apparatus for pulverization of a polymeric material, comprising:
    an elongated cylindrical housing, said elongated cylindrical housing comprising an extrusion section and a pulverization section having a smooth inner surface; and
    at least one multi-component screw disposed within said elongated cylindrical housing and having an extrusion portion and a pulverization portion having a smooth outer surface, said extrusion portion and said pulverization portion being independently rotatable.

2. An apparatus in accordance with claim 1, wherein said pulverization portion is conically convergent.

3. An apparatus in accordance with claim 1 further comprising cooling means for cooling said pulverization section.

4. An apparatus in accordance with claim 3, wherein said pulverization section of said elongated cylindrical housing is surrounded by a cooling jacket.

5. An apparatus in accordance with claim 3, wherein said pulverization portion of said at least one multi-component screw forms at least one passage whereby cooling fluid is circulated through an interior of said pulverization portion.

6. An apparatus in accordance with claim 1, wherein a distance between an outer diameter of the first pulverization portion and an inner diameter of the elongated cylindrical housing is about 0.05 mm to about 10.0 mm.

7. An apparatus in accordance with claim 1, wherein an extrusion outer diameter of said extrusion portion is larger than a pulverization outer diameter of said pulverization portion.

8. An apparatus in accordance with claim 1, wherein said pulverization portion of the multi-component screw is a solid shaft.

9. An apparatus in accordance with claim 1, wherein said pulverization portion of the multi-component screw is a hollow cylinder.

10. An apparatus in accordance with claim 1, wherein two said multi-component screws are disposed within said elongated cylindrical housing.

11. An apparatus in accordance with claim 10, wherein said multi-component screws are rotatable in opposite directions.

12. An apparatus in accordance with claim 1, wherein said multi-component screw has a plurality of flights, each of said flights having a flight depth of about 0.1 mm to about 6.0 mm.

13. An apparatus in accordance with claim 1, wherein a controllable radial distance constant along a length of said pulverization portion is defined between said smooth inner surface of the pulverization section and said smooth outer surface of the pulverization portion.

14. A process for pulverization of polymeric material comprising the steps of:
    feeding a polymeric material into an elongated cylindrical housing having an upstream extrusion section and a downstream pulverization section and a rotatable screw disposed within said elongated cylindrical housing having an upstream extrusion portion and a downstream pulverization portion;
    heating said polymeric material in said extrusion section of said elongated cylindrical housing to at least a softening temperature, forming a heated polymeric material;
    conveying said polymeric material into said pulverization section by rotating said extrusion portion of said rotatable screw at a first speed;
    cooling said heated polymeric material from said at least softening temperature and applying normal and shear forces sufficient to form a fine powder of said polymeric material, said forces being applied by rotation of said pulverization portion of said rotatable screw at a second speed, said rotation being independent of the rotation of said extrusion portion; and
    controlling a constant radial distance between an inner surface of said pulverization section of said elongated cylindrical housing and an outer surface of said pulverization portion along a length of the pulverization portion to pulverize said polymeric material.

15. A process in accordance with claim 14, further comprising the step of cooling said pulverization portion of said rotatable screw.

16. A process in accordance with claim 14, further comprising the step of surrounding at least a portion of the elongated cylindrical housing with a cooling jacket to maintain the fine powder within the pulverization section at a desired temperature.

17. A process in accordance with claim 14, further comprising the step of controlling a particle size distribution of the fine powder by cooling at least one of the elongated cylindrical housing and the rotatable screw.

18. A process in accordance with claim 14, further comprising the step of controlling a particle size distribution of the fine powder by controlling said radial distance between said inner surface of the elongated cylindrical housing and said outer surface of the pulverization portion of the rotatable screw.

19. A process in accordance with claim 14, further comprising the step of controlling a particle size distribution of the fine powder by controlling a length of an outer surface of the pulverization portion of the rotatable screw.

20. A process in accordance with claim 14, wherein said first speed and said second speed are equal.

21. A process in accordance with claim 14, wherein said first speed and said second speed are different.

22. A process in accordance with claim 14, wherein an extrusion portion direction of rotation is opposite a pulverization portion direction of rotation.

23. A process in accordance with claim 14, wherein the extrusion portion and the pulverization portion rotate in a same direction.

24. A process in accordance with claim 14, wherein a cooling fluid is circulated through an interior space formed by said pulverization portion of said rotatable screw.

25. A process in accordance with claim 24, wherein said cooling fluid is a gas.

26. A process in accordance with claim 24, wherein said cooling fluid is a liquid.

27. A process in accordance with claim 24, wherein said cooling fluid is water.

28. A process in accordance with claim 14, wherein said pulverization portion of said rotatable screw is rotated at about 10 RPM to about 1500 RPM.

29. A process in accordance with claim 14, wherein said extrusion portion of said rotatable screw is rotated at about 10 RPM to about 1500 RPM.

30. A process in accordance with claim 14, wherein said pre-softening temperature is about 3° C. to about 50° C. below said melting point of said polymeric materials.

31. A process in accordance with claim 14, wherein said polymeric material is selected from the group consisting of synthetic polymers and natural polymers.

32. A process in accordance with claim 14, wherein said polymeric material is selected from the group consisting of polyethylene terephthalate, high-density polyethylene, low-density polyethylene, polypropylene, polyvinyl chloride, styrenes, acrylics, polycarbonates, polyamides, polyurethanes, rubber, natural polymers, cross-linked polymers and mixtures thereof.

33. A process in accordance with claim 14, wherein at least one of said outer surface of the pulverization portion and said inner surface of the pulverization section is generally smooth.

34. A process in accordance with claim 14, wherein at least one of said outer surface of the pulverization portion and said inner surface of the pulverization section is generally notched.

* * * * *